US011743694B2

(12) United States Patent
Ong et al.

(10) Patent No.: US 11,743,694 B2
(45) Date of Patent: *Aug. 29, 2023

(54) VEHICLE TO EVERYTHING OBJECT EXCHANGE SYSTEM

(71) Applicant: Verizon Patent and Licensing Inc., Basking Ridge, NJ (US)

(72) Inventors: Hoo Dennis Ong, Westerville, OH (US); Julie Nicole Vogelman, Sunnyvale, CA (US); Brian Peebles, Cranford, NJ (US); Mourad B. Takla, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,099

(22) Filed: Jun. 2, 2022

(65) Prior Publication Data

US 2022/0303734 A1 Sep. 22, 2022

Related U.S. Application Data

(63) Continuation of application No. 16/986,187, filed on Aug. 5, 2020, now Pat. No. 11,375,344.

(51) Int. Cl.
*H04W 4/40* (2018.01)
*H04W 4/08* (2009.01)
(Continued)

(52) U.S. Cl.
CPC ............. *H04W 4/08* (2013.01); *H04W 4/021* (2013.01); *H04W 4/40* (2018.02); *H04W 4/60* (2018.02)

(58) Field of Classification Search
CPC ......... H04W 4/08; H04W 4/021; H04W 4/40; H04W 4/60; H04W 4/029
See application file for complete search history.

(56) References Cited

U.S. PATENT DOCUMENTS

2013/0279392 A1   10/2013   Rubin et al.
2015/0120183 A1   4/2015    Annapureddy et al.
(Continued)

OTHER PUBLICATIONS

"ABI Research IoT Market Tracker", Retail 2019. 5 pages. Aug. 5, 2020. https://www.abiresearch.com/market-research/product/1033363-iot-market-tracker-retail/.
(Continued)

*Primary Examiner* — Chuong A Ngo

(57) ABSTRACT

A device may include a memory storing instructions and processor configured to execute the instructions to register client devices to receive Vehicle-to-Everything (V2X) messages, including at least one Road Side Unit (RSU) configured to broadcast messages to vehicles using Wireless Local Area Network (WLAN) signals or using cellular wireless signals over a PC5 interface. The processor may be further configured to receive a V2X message; determine a geographic area associated with the received V2X message; determine a message type for the received V2X message; identify a set of client devices located in the identified geographic area and subscribed to receive V2X messages of the identified message type; select a subset of client devices, of the identified set of client devices, based on geographic or situational relevance; and send the received V2X message to the selected subset of client devices, including the at least one RSU.

20 Claims, 11 Drawing Sheets

(51) Int. Cl.
*H04W 4/60* (2018.01)
*H04W 4/021* (2018.01)

(56) References Cited

U.S. PATENT DOCUMENTS

| | | |
|---|---|---|
| 2019/0124489 A1 | 4/2019 | Ahmad et al. |
| 2020/0280842 A1 | 9/2020 | Liu et al. |
| 2020/0342760 A1* | 10/2020 | Vassilovski ............ G08G 1/161 |
| 2021/0061279 A1 | 3/2021 | Nagata et al. |
| 2021/0280064 A1 | 9/2021 | Takla |
| 2022/0191649 A1* | 6/2022 | El Essaili ............... H04W 4/40 |

OTHER PUBLICATIONS

"Americas Fleet Management Markets, 2019-2023: Verizon Lead the Market, Followed by Geotab, Trimble and Omnitracs, Zonar Systems—ResearchAndMarkets.com", Nov. 12, 2019. 8 pages. https://www.businesswire.com/news/home/20191112005532/en/Americas-Fleet-Management-Markets-2019-2023-Verizon-Lead.

"FCC Seeks to Promote Innovation in the 5.9 GHz Band", Federal Communications Commission. Dec. 13, 2019. 2 pages. https://www.fcc.gov/document/fcc-seeks-promote-innovation-59-ghz-band.

"Ford Accelerates Connectivity Strategy in China: Targets Production of First C-V2X-Equipped Vehicle in 2021", Mar. 26, 2019. Shanghai, China. 3 pages. https://media.ford.com/content/fordmedia/fap/cn/en/news/2019/03/26/Ford_Accelerates_Connectivity_Strategy_in_China_And_Targets_Production_of_First_C-V2X-Equipped_Vehicle_in_2021.html.

"Georgia Department of Transportation Press Release", Georgia DOT Prepares Transportation Infrastructure for imminent Adoption of Connected Vehicle Technology. Feb. 6, 2020. http://www.itsga.org/georgia-dot-expands-infrastructure-supporting-connected-vehicles/.

"On the road to automated mobility: An EU strategy for mobility of the future", European Commission, Brussels, May 17, 2018. 18 pages. https://ec.europa.eu/transport/sites/transport/files/3rd-mobility-pack/com20180283_en.pdf.

"Press Releases", 5G Automotive Association Accessed May 2, 2020. 9 pages. https://5gaa.org/news/5gaa-live-demos-show-c-v2x-as-a-market-reality/.

"V2X Communications for Transportation: An Overview", US Department of Transportation. U.S. Department of Transportation. Accessed May 2, 2020. 36 pages. https://www.transportation.gov/research-and-technology/v2x-communications-transportation-overview.

Meola, "How 5G & IoT Technologies Are Driving the Connected Smart Vehicle Industry", Business Insider. Mar. 10, 2020. 11 pages. https://www.businessinsider.com/iot-connected-smart-cars.

* cited by examiner

VEHICLE TO EVERYTHING OBJECT EXCHANGE SYSTEM

CROSS-REFERENCE TO RELATED APPLICATIONS

This patent application is a continuation of U.S. patent application Ser. No. 16/986,187, filed on Aug. 5, 2020, and titled "VEHICLE TO EVERYTHING OBJECT EXCHANGE SYSTEM," the disclosure of which is hereby incorporated by reference in their entirety.

BACKGROUND INFORMATION

A vehicle may include a computer device that collects information relating to the vehicle. For example, the computer device may collect information relating to the vehicle's location. The vehicle information may be stored for use in various telematics applications, such as, for example, vehicle tracking, navigation, or fleet management applications. Processing telematics information may pose various challenges.

DETAILED DESCRIPTION OF PREFERRED EMBODIMENTS

Figure 1:
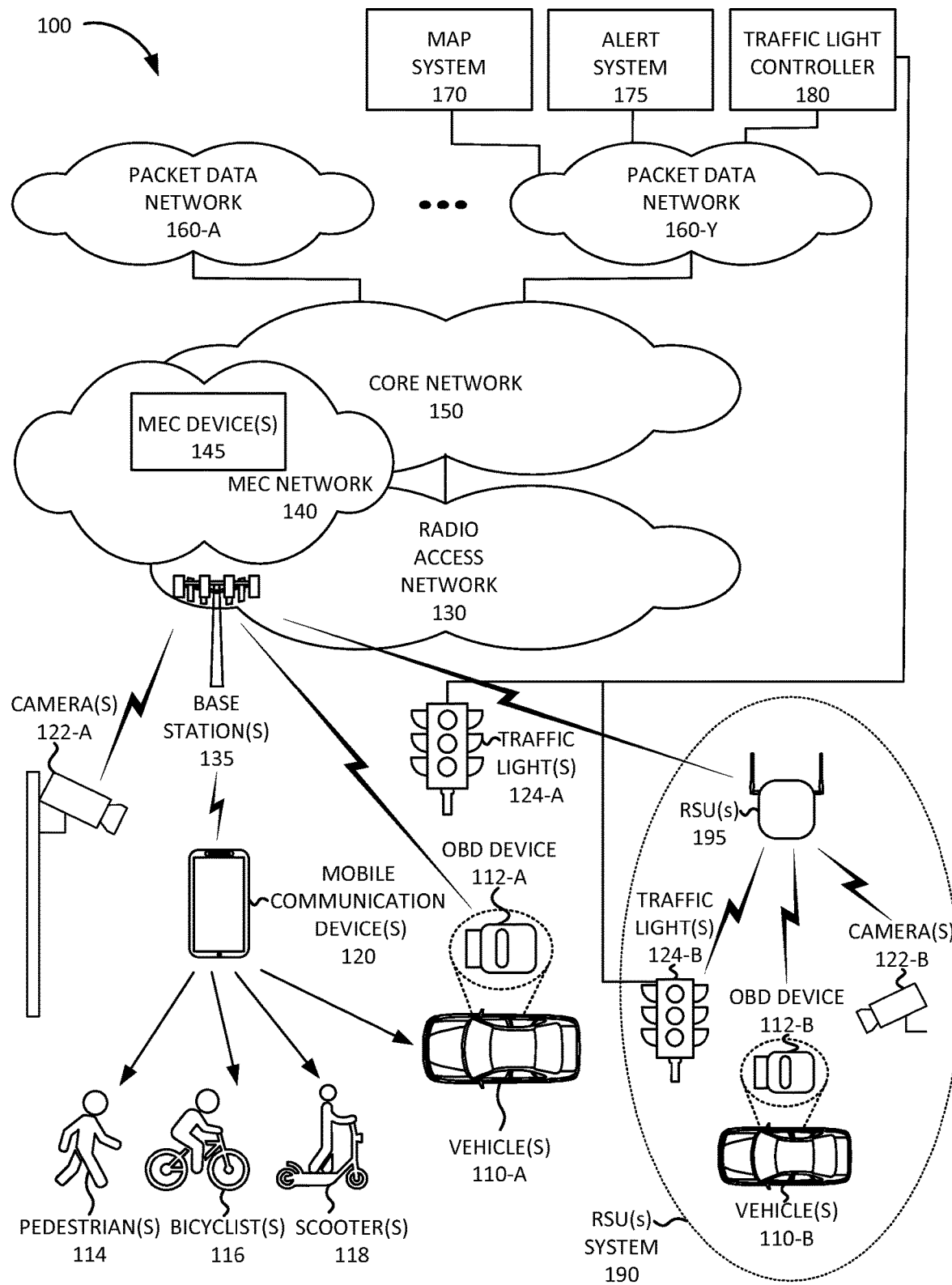
FIG. 1 illustrates an environment according to an implementation described herein.

The following detailed description refers to the accompanying drawings. The same reference numbers in different drawings identify the same or similar elements.

In order to reduce the number of road accidents and to enhance road safety, a vehicle may need to obtain information relating to what is happening in the area around the vehicle, foresee what may happen next, and take protective action. Thus, vehicles may need to be able to exchange messages with each other in order to reduce the number of collisions. Vehicle and road sensors, such as radar, lidar, and/or ultrasonic detectors may not be able to obtain information out of line-of-sight of a vehicle or outside a particular detection range. A Vehicle-to-Everything (V2X) system may include a wireless communication system that enables vehicles to share information with each other via a communication channel and may enable vehicles to receive more information about the environment and other vehicles than vehicle and/or road sensors by themselves. A V2X system may enable and/or include Vehicle-to-Vehicle (V2V) communication, Vehicle-to-Pedestrian (V2P) communication, Vehicle-to-Infrastructure (V2I) communication, and/or other types of communication associated with vehicles.

A V2X system may use wireless local area network (WLAN) technology, such as WiFi technology based on the Institute of Electrical and Electronics Engineers (IEEE) 802.11 family of standards. An example of such a system is a Direct Short Radio Communications (DSRC) system that uses the 5.9 Gigahertz (GHz) band for wireless communication. A DSRC system may send messages based on the Society of Automotive Engineering (SAE) J2735 standard, such as Basic Safety Messages (BSMs) that include location information for vehicles, Personal Safety Messages (PSMs) that include location information for pedestrians, Signal Phase and Timing (SpaT) messages that include information relating to the status of traffic lights, Roadside Alert Messages (RSAs) that include information relating to hazardous road conditions, such as ice on a bridge, Emergency Vehicle Alert (EVA) messages that announce the presence of an emergency vehicle, and/or other types of messages. Other types of WLAN based V2X systems may include an Intelligent Transport System (ITS) based on the European Telecommunications Standards Institute (ETSI) EN 302 637 standard that sends and receives Cooperative Awareness Messages (CAMs); a Driving Safety Support System (DSSS) that uses infrared beacons in combination with WLAN; and/or other types of WLAN systems.

Various municipalities and organizations have deployed a WLAN system, such as a DSRC system, locally to enhance vehicle safety. However, deploying a DRSC system requires installation of Roadside Units (RSUs). An RSU may include a WLAN transceiver that receives messages from vehicles, pedestrians, road sensors, traffic light controllers, and/or other types of devices and broadcast the messages in their coverage area. However, a DSRC RSU may be limited to 300 meters. Because of the short transmission range, achieving adequate coverage in a geographic area may require a large number of RSU, resulting in a high deployment cost.

Another V2X technology is Cellular V2X (C-V2X). C-V2X may use cellular wireless communication based on a Third Generation Partnership Project (3GPP) standard, such as Fourth Generation (4G) Long Term Evolution (LTE) air interface or a Fifth Generation (5G) New Radio (NR) air interface. In some implementations, C-V2X may use a short-range PC5 interface in the 5.9 GHz band for C-V2V, C-V2P, and/or C-V2I communication. In other implementations, C-V2X may use Vehicle-to-Network (V2N) communication that uses a Uu interface in the licensed spectrum, for example in the 20 Megahertz (MHz) band, to support communication between vehicles and a cellular Radio Access Network (RAN) of base stations.

While some cities may deploy dual RSUs enabled to use both DSRC and PC5, other cities or other types of entities or jurisdictions, may deploy RSUs enabled to only use DSRC or RSUs enabled to only use PC5. A DSRC RSU and DSRC-enabled vehicles may not be able to communicate with PC5 RSUs or PC5-enabled vehicles. For example, a DSRC RSU at a first intersection may not be able to communicate with a PC5 RSU at a second nearby intersection. Furthermore, vehicles enabled for PC5 may not be able to communicate with vehicles using V2X communication over a particular interface (e.g., the Uu interface). For example, a smart camera providing vehicle and pedestrian recognition information may send data to a PC5 RSU and the PC5 RSU may then broadcast the vehicle and pedestrian recognition information in its coverage area. However, vehicles enabled for V2X communication using the Uu interface may not be able to receive the vehicle and pedestrian recognition information from a PC5 RSU. As another example, if an ambulance is sending out an EVA message alerting its presence using the Uu interface, as the ambulance enters a DSRC coverage area, the vehicles in the area configured to use DSRC may not receive the EVA message. Thus, vehicles in an area that includes different types of V2X technology may not be able to communicate with each other.

Implementations described herein relate to V2X object exchange system configured to enable devices associated with different V2X technologies to communicate with each other. The V2X object exchange system may provide coverage using Fourth Generation (4G) Long Term Evolution (LTE) and/or Fifth Generation (5G) New Radio (NR) cellular wireless communication using a Uu interface. For example, the V2X object exchange system may be implemented in a Multi-Access Edge Computing (MEC) device and associated with a set of 4G and/or 5G base stations, enabling devices in the coverage area to send and receive V2X message via the V2X object exchange system.

The V2X object exchange system may register client devices to receive V2X message. The client devices may include on-board diagnostics (OBD) devices in vehicles and/or mobile communication devices associated with vehicles and/or other types of users that may be in the vicinity of vehicles, such as, for example, pedestrians, bicyclists, and/or riders of electric scooters. Furthermore, RSUs configured to broadcast messages to vehicles using WLAN signals, such as, for example, DSRC RSUs, CAM RSUs, DSSS RSUs, and/or RSUs configured to broadcast cellular wireless signals using a PC5 interface, may register as client devices of the V2X object exchange system. The V2X object exchange system may thus enable V2X messages to be exchanged between RSUs that use different communication technologies, such as a DSRC RSU and a PC5 RSU. In some implementations, the V2X object exchange system may translate a V2X message from a first format associated with a first technology (e.g., a message received from a first type of RSU) into a second format associated with a second technology (e.g., a message sent to a second type of RSU). Each client device may be associated with a particular geographic area and may subscribe to receive particular types of messages. The V2X object exchange system may update the location of mobile client devices at particular intervals in order to be able to determine which messages are geographically relevant to particular client devices.

The V2X object exchange system may be configured to receive V2X messages from client devices and/or from other sources of V2X messages. For example, the V2X object exchange system may receive a V2X message from an RSU; an OBD device in a vehicle; a mobile communication device associated with a vehicle or another type of user that may be in the vicinity of a vehicle (e.g., a pedestrian, etc.); a street camera configured to perform object detection to identify vehicles, pedestrians, bicycles, etc.; a traffic signal controller; an alert system that generates V2X messages based on information received from a road sensor, a road maintenance system, a weather reporting system, and/or another source of information that may be relevant to vehicles; and/or another source of V2X messages.

Upon receiving a V2X message, the V2X object exchange system may determine a geographic area associated with the received V2X message and a message type associated with the received V2X message. The message type may include, for example, a BSM type, a PSM type; a SPaT message type, an RSA message type, an EVA message type, and/or another message type. The V2X object exchange system may identify a set of client devices located in the geographic area associated with the received V2X message (e.g., within a particular geographic distance of a location associated with the received V2X message) and subscribed to receive messages of the message type determined for the received V2X message.

The V2X object exchange system may select a subset of client devices from the identified set of client devices based on a set of rules (e.g., geographic or situational relevance) and send the received V2X message to the selected subset of client devices using a Uu interface. For example, the V2X object exchange system may eliminate a client device from the identified set of client devices based on: determining that the client device is located on a second street that is different than a first street associated with the received V2X message, if the second street is parallel to the first street or located more than one intersection away from the first street; determining that the client device is driving in an opposite direction on a divided road compared to a direction associated with the received V2X message; determining that the client device is associated with a parked vehicle; determining that the client device is associated with a same vehicle as the received V2X message; determining that the client device is inside a building; and/or another criterion. These scenarios are described as examples of rule-sets that the system may implement as defined by an administrator of the system. In some embodiments the rules may be predefined and refined over time using machine learning to develop more accurate filtering of the subset of client devices to receive the V2N messages.

Filtering the identified set of client devices based on geographic and/or situational relevance may reduce the number of client devices that receive the V2X message by not sending the V2X message to client devices that may not benefit from receiving the V2X message. Reducing the number of client devices to which the V2X message is sent may result in more efficient use of the network bandwidth resources. Furthermore, ensuring that the V2X message is geographically and/or situationally relevant to a client device may reduce the number of V2X message that a client device receives, conserving the resources of the client device and reducing the likelihood that a user associated with the client device becomes habituated to ignore safety messages.

While particular types of client devices (e.g., OBD devices, mobile communication devices, etc.) may be filtered based on geographic or situational relevance, a client RSU may receive all V2X messages associated with a geographic area for message types for which the client RSU is subscribed, since the client RSU may broadcast received messages to all the client devices of the RSU within the RSU's coverage area.

Furthermore, a V2X object exchange system may need to be able to operate and send V2X messages within short periods of time (e.g., 10 times a second, etc.), in order to provide safety information to client devices during situations involving vehicles moving at high speeds. The required low latency, high processing capacity, and high processing speed may be achieved with a wireless 5G NR connection to a base station and a MEC network associated with the base station. For example, the V2X object exchange system in a MEC network communicating with client devices using 5G NR wireless signals may receive a V2X message, determine which client devices should receive the V2X message, and send the V2X message to the determined client devices within 50-100 milliseconds (ms). In comparison, other wireless network technologies may experience latencies of 200 ms or more, which may not be adequate to warn a vehicle in time to avoid a collision.

FIG. 1 is a diagram of an exemplary environment 100 in which the systems and/or methods, described herein, may be implemented. As shown in FIG. 1, environment 100 may include one or more vehicles 110 that include on-board diagnostics (OBD) devices 112, pedestrians 114, bicyclists 116, scooters 118, mobile communication devices 120, cameras 122, traffic lights 124, a radio access network (RAN) 130 that includes base station(s) 135, a MEC network 140 that includes MEC devices 145, a core network 150, packet data networks 160-A to 160-Y, a map system 170, an alert system 175, a traffic light controller 180, and one or more RSU systems 190 that include RSU(s) 195. Vehicles 110, OBD devices 112, pedestrians 114, bicyclists 116, scooters 118, mobile communication devices 120, cameras 122, traffic lights 124, base stations 135, packet data networks 160, and RSUs 195 may be referred to herein collectively as "vehicles 110," "pedestrians 114," "bicyclists 116," "scooters 118," "mobile communication devices 120," "cameras 122," "traffic lights 124," "base stations 135," "MEC devices 145," "packet data networks 160," and "RSUs 195," and individually as "vehicle 110," "OBD device 112," "pedestrian 114," "bicyclist 116," "scooter 118," "mobile communication device 120," "camera 122," "traffic light 124," "base station 135," "MEC device 145," "packet data network 160," and "RSU 195," respectively.

Vehicles 110 may include motorized vehicles in an area serviced by RAN 130 and/or area serviced by RSU 195. Each vehicle may include an OBD device 112 installed in the vehicle. OBD device 112 may be plugged into the OBD port of vehicle 110 and may collect information relating to the status and operation of vehicle 110. For example, vehicle 110-A may include OBD device 112-A that communicates with base station 135 and vehicle 110-B may include OBD device 112-B that communicates with RSU 195. Furthermore, OBD device 112 may include a collection of sensors and receivers, such as a Global Positioning System (GPS) receiver, a Real-Time Kinematic (RTK) receiver, a compass, an accelerometer, that generate information relating to the movement of vehicle 110.

Pedestrians 114 may include pedestrians in the area associated with vehicles 110. Bicyclists 116 may include moving bicyclists in the area associated with vehicles 110. Scooters 118 may include moving electric scooters in the area associated with vehicles 110. Mobile communication devices 120 may be associated with particular vehicles 110, pedestrians 114, bicyclists 116, and/or scooters 118. For example, a driver of vehicle 110, pedestrian 114, bicyclist 116, and/or a user of scooter 118 may each have in possession a mobile communication device 120.

Mobile communication device 120 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer device with wireless communication capabilities and/or a user interface. Mobile communication device 120 may communicate with base station 135 using cellular wireless signals.

Cameras 122 may be installed throughout the area associated with vehicles. Cameras 122 may be installed on poles, buildings, and/or other structures in positions that enable capturing images of vehicles 110, pedestrians 114, bicyclists 116, and/or scooters 118 in the area. In other implementations, cameras 122 may include mobile cameras, such as, for example, cameras included in mobile communication devices or vehicles. Camera 122 may include a digital camera for capturing and digitizing images using an array of sensors. The captured image data may include a continuous image sequence (e.g., video), a limited image sequence, still images, and/or a combination thereof. Cameras 122 may capture image and/or video data using visible light, infrared light, and/or other non-visible electromagnetic radiation (e.g., ultraviolet light, infrared light, terahertz radiation, etc.). In some implementations, camera 122 may include a depth camera that captures depth information. For example, for each pixel, the depth camera may obtain color information as well as depth information.

Camera 122 may include wireless communication functionality to transmit captured images or video of vehicles 110, pedestrians 114, bicyclists 116, and/or scooters 118 to MEC network 140 via base station 135 and/or to RSU 195. For example, camera 122-A may communicate with base station 135 and camera 122-B may communicate with RSU 195. Camera 122 may perform object recognition to identify particular vehicles 110, pedestrians 114, bicyclists 116, scooters 118 and/or other types of users in the captured images or videos and/or determine the position, bearing, speed, and/or acceleration of particular vehicles 110, pedestrians 114, bicyclists 116, and/or scooters 118 in the captured images or videos. Camera 122 may provide the object detection information to a V2X object exchange system (e.g., located in MEC device 145) via base station 135 and the V2X object exchange system may generate a V2X message based on the received information, such as, for example, a BSM, a PSM, etc.

Traffic lights 124 may be located in the area associated with vehicles 110, pedestrians 114, bicyclists 116, and/or scooters 118 and may include signaling devices to control the flow of traffic at road intersections, bicycle trails, and/or pedestrian crossings. Traffic lights 124 may be controlled by one or more traffic light controllers 180. In some implementations, traffic light 124 may send SPaT messages via wireless signals. For example, traffic light 124-A may communicate with base station 135 and traffic light 124-B may communicate with RSU 195.

RAN 130 may include base stations 135. In some implementations, base station 135 may include a 5G NR base station, also referred to as a gNodeB. In other implementations, base station 135 may include a 4G LTE base station, also referred to as an eNodeB. Each base station 135 may include devices and/or components to enable wireless communication with OBD devices 112, mobile communication devices 120, cameras 122, RSUs 195, and/or other devices perceived as UE devices by base station 135.

RAN 130 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality. Base station 135 may be associated with MEC network 140.

MEC network 140 may provide MEC services for UE devices attached to base station 135. MEC network 140 may be in proximity to the one or more base stations 135 from a geographic and network topology perspective. As an example, MEC network 140 may be located on a same site as base station 135. As another example, MEC network 140 may be geographically closer to base station 135, and reachable via fewer network hops and/or fewer switches, than other base station and/or packet data networks 160. As yet another example, MEC network 140 may be reached without having to interface with a gateway device, such as a 4G Packet Data Network Gateway (PGW) or a 5G User Plane Function (UPF).

MEC network 140 may interface with RAN 130 and/or with core network 150 via a MEC gateway device (not shown in FIG. 1). In some implementations, MEC network 140 may be connected to RAN 130 via a direct connection to base station 135. For example, MEC network 140 may connect to a gNodeB via an N3 interface. In other implementations, MEC network 140 may include, or be included in, core network 150. As an example, MEC network 140 may connect to a Session Management Function (SMF) via an N4 interface. MEC network 140 may support UE device mobility and handover application sessions between MEC network 140 and another MEC network.

MEC network 140 may include a MEC device 145. MEC network 140 may support device registration, discovery, and/or management of MEC devices 145 in MEC network 140. MEC device 145 may include particular hardware components, such as central processing units (CPUs), graphics processing units (GPUs), tensor or dataflow processing units, hardware accelerators, and/or other types of hardware components. Furthermore, MEC device 145 may include particular software components, such as a particular operating system, virtual machine, virtual container, application, and/or another type of software components or programs. MEC device 145 may connect to base station 135 in RAN 130 and provide one or more MEC services to UE devices connected to base station 135. Consistent with implementations described herein, MEC device 145 may include a V2X object exchange system that enables V2X communication with OBD devices 112, mobile communication devices 120, cameras 122, traffic lights 124, and RSUs 195.

Core network 150 may manage communication sessions for UE devices serviced by base station 135. For example, core network 150 may establish an Internet Protocol (IP) connection between UE devices and a packet data network 160. Furthermore, core network 150 may enable UE devices to communicate with an application server, and/or another type of device, located in a packet data network 160 using a communication method that does not require the establishment of an Internet Protocol (IP) connection between a UE device and packet data network 160, such as, for example, Data over Non-Access Stratum (DoNAS). For example, in other implementations, a V2X object exchange system may be included in a server device in core network 150, rather than in MEC device 145 in MEC network 140.

In some implementations, core network 150 may include an LTE core network (e.g., an evolved packet core (EPC) network). An EPC network may include devices that implement: network functions that include a Mobility Management Entity (MME) for control plane processing, authentication, mobility management, tracking and paging, and activating and deactivating bearers; an SGW that provides an access point to and from UE devices, acts as a local anchor point during handovers, and directs gateway to a PGW; a PGW that functions as a gateway to a particular packet data network 160; a Policy and Charging Rules Function (PCRF) that implements policy and charging rules functions, such as establishment of Quality of Service (QoS) requirements, setting allowed bandwidth and/or data throughput limits for particular bearers, and/or other policies; and a Home Subscriber Server (HSS) that stores subscription information for UE devices, including subscription profiles that include authentication and access authorization information, group device memberships, subscription privileges, and/or other types of subscription information.

In other implementations, core network 150 may include a 5G core network. A 5G core network may include devices that implement network functions that include an Access and Mobility Function (AMF) to perform registration management, connection management, reachability management, mobility management, and/or lawful intercepts; an SMF to perform session management, session modification, session release, IP allocation and management, Dynamic Host Configuration Protocol (DHCP) functions, and selection and control of a UPF; a UPF to serve as a gateway to packet data network 160, act as an anchor point, perform packet inspection, routing, and forwarding, perform QoS handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device; and/or other types of network functions.

Packet data networks 160-A to 160-N may each include a packet data network. A particular packet data network 160 may be associated with an Access Point Name (APN) and a UE device may request a connection to the particular packet data network 160 using the APN. Packet data network 160 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, an intranet, or a combination of networks.

Map system 170 may include one or more computer devices, such as server devices, configured to generate and/or maintain maps of the area associated with base stations 135 and/or RSUs 195. A map of the area may include the location of streets and street lanes, buildings and other structures, traffic lights, pedestrian walkways and pedestrian crossings, bicycle trails and bicycle trail crossings, and/or other information that may be used by a V2X object exchange system to determine geographic and/or situational relevance for a V2X message with respect to a client device. Map system 170 may provide maps of the area to V2X object exchange system in MEC device 145.

Alert system 175 may include one or more computer devices, such as server devices, configured to generate V2X messages based on information obtained from other devices. As an example, alert system 175 may receive information from road sensors that sense the presence of vehicles 110, such as road sensors that detect traffic congestion, vehicle accidents, hazardous road conditions, road construction, road closures, and/or other types of road conditions. As another example, alert system 175 may receive and/or aggregate weather information from a weather reporting system. As yet another example, alert system 175 may receive and/or aggregate traffic information from a traffic reporting system. As yet another example, alert system 175 may receive alert information from a law enforcement agency. Alert system 175 may provide the received and/or aggregated information to a V2X object exchange system in MEC device 145.

Traffic light controller 180 may include one or more computer devices, such as server devices, configured to control traffic lights 124. Traffic light controller 180 may provide information relating to the status of particular traffic lights 124, such as SPaT messages, to a V2X object exchange system in MEC device 145. Furthermore, in some implementations, traffic light controller 180 may receive instructions from MEC device 145. For example, MEC device 145 may instruct traffic light controller 180 to extend the duration of a red or green traffic light of a particular traffic light 124 to reduce the likelihood of a collision at a particular intersection. In other implementations, traffic lights 124 may communicate directly with the V2X object exchange system via base station 135 or RSU 195.

RSU system 190 may include RSU 195, OBD devices 112 in vehicles 110, cameras 122, and traffic lights 124. RSU 195 may include, for example, a DSRC RSU that communicates with vehicles 110, cameras 122, and traffic lights 124 using DSRC messages. As another example, RSU 195 may include a PC5 RSU that communicates with vehicles 110, cameras 122, and traffic lights 124 using PC5 messages. As yet another example, RSU 195 may include a CAM RSU that communicates with vehicles 110, cameras 122, and traffic lights 124 using CAM messages based on an ETSI EN 302 637 standard. As yet another example, RSU 195 may include a DSSS RSU that communicates with vehicles 110, cameras 122, and traffic lights 124 using DSSS messages.

RSU 195 may receive V2X messages from OBD devices 112, cameras 122, and/or traffic lights 124 and may broadcast received V2X message to all client devices of RSU 195 within the coverage area of RSU 190. Furthermore, RSU 195 may forward V2X messages, received from OBD devices 112, cameras 122, and/or traffic lights 124, as V2X messages to a V2X object exchange system in MEC device 145 via base station 135 using a Uu interface. Moreover, RSU 195 may receive a V2X message from V2X object exchange system in MEC device 145 via base station 135 using a Uu interface and broadcast the received V2X message as a V2X message to client devices in its coverage area.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
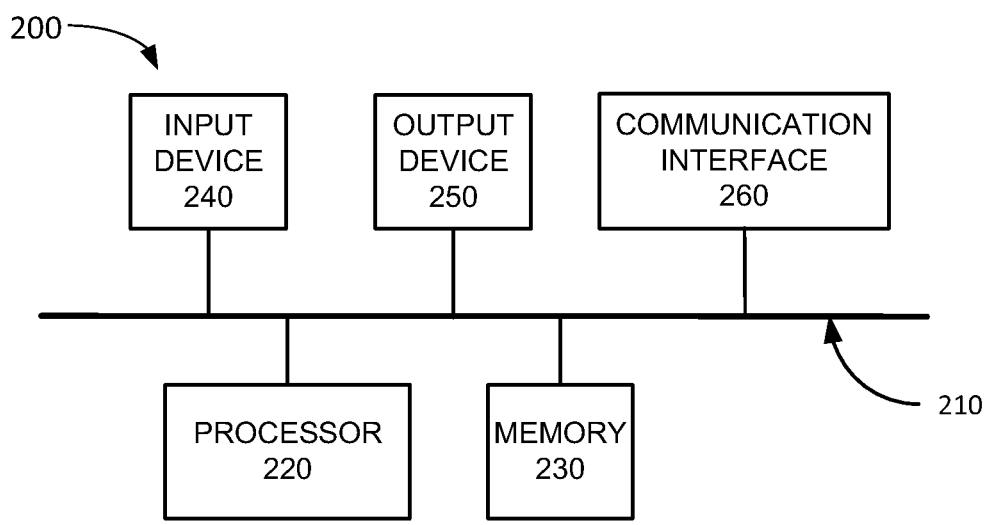
FIG. 2 illustrates exemplary components of a device that may be included in the environment of FIG. 1 according to an implementation described herein.

FIG. 2 is a diagram illustrating example components of a device 200 according to an implementation described herein. OBD device 112, mobile communication device 120, camera 122, base station 135, MEC device 145, map system 170, alert system 175, traffic light controller 180, and/or RSU 195 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to the operation of a V2X object exchange system. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
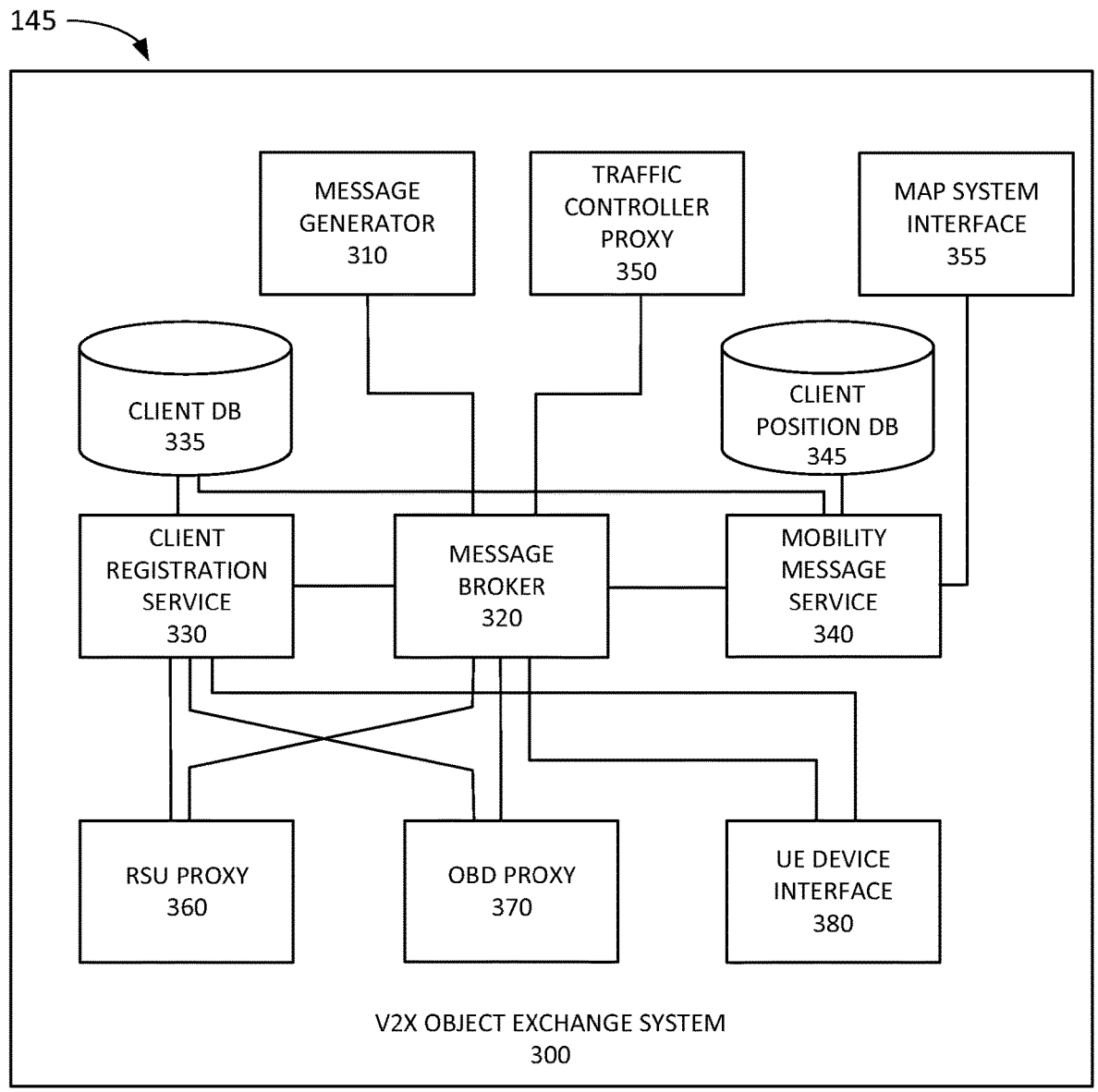
FIG. 3 illustrates exemplary components of the Multi-access Edge Computing (MEC) device of FIG. 1 according to an implementation described herein.

FIG. 3 is a diagram illustrating exemplary components of MEC device 145. The components of MEC device 145 may be implemented, for example, via processor 220 executing instructions from memory 230. Alternatively, some or all of the components of MEC device 145 may be implemented via hard-wired circuitry. Furthermore, some or all of the components of MEC device 145 may be implemented using one or more hardware accelerators, such as GPUs, tensor or dataflow processing units, and/or other types of hardware accelerators.

As shown in FIG. 3, MEC device 145 may include a V2X object exchange system 300. V2X object exchange system 300 may enable OBD devices 112, mobile communication devices 120, cameras 122, traffic lights 124, and/or RSUs 195 to exchange V2X messages using a Uu interface. Although V2X object exchange system 300 is shown as being included in MEC device 145, in other implementations, some or all of the components of V2X object exchange system 300 may be implemented in a device outside of MEC network 140 (e.g., in core network 150) and may be coupled to low latency device (e.g., hardware accelerators) of MEC device 145 as needed to perform low latency processing. As shown in FIG. 3, V2X object exchange system 300 may include a message generator 310, a message broker 320, a client registration service 330, a client DB 335, a mobility message service 340, a client position DB 345, a traffic controller proxy 350, a map system interface 355, an RSU proxy 360, an OBD proxy 370, and a UE device interface 380.

Message generator 310 may generate V2X messages based on information received from cameras 122 and/or alert system 175. For example, message generator 310 may receive object recognition information from camera 122 and generate a BSM or a PSM based on the received object recognition information. As an example, camera 122 may detect the presence of pedestrian 114, bicyclist 116, and/or electric scooter 118 at a particular location and moving in a particular direction and message generator 310 may generate a PSM with information indicating the location and direction of movement of a pedestrian, bicyclist, or electric scooter. As another example, camera 122 may detect the presence of vehicle 110 at a particular location and moving in a particular direction and message generator 310 may generate a BSM with information indicating the location and direction of movement of vehicle 110.

As another example, message generator 310 may receive an alert message from alert system 175, such as an alert message relating to traffic congestion, vehicle accidents, hazardous road conditions, road construction, road closures, weather events, law enforcement emergencies, and/or other types of alert information. In response, message generator 310 may generate an RSA message with the alert information.

Message broker 320 may receive messages from client devices, such as OBD devices 112, mobile communication devices 120, and/or RSUs 195, as well as from cameras 122, traffic lights 124 and/or traffic light controller 180, and/or V2X messages generated by message generator 310. Message broker 320 may publish the received V2X messages to mobility message service 340. Furthermore, message broker 320 may receive a client-specific V2X message from mobility message service 340 and may publish the received client-specific V2X message to a component that is enabled to deliver the client-specific V2X message to client device, such as RSU proxy 360, OBD proxy 370, and/or UE device interface 380. In some implementations, message broker 320 may publish V2X messages using Message Queueing Telemetry Transport (MQTT). In other implementations, message broker 320 may use a different publish-subscribe protocol to distribute V2X messages.

Client registration service 330 may register client devices. Client registration service 330 may assign a client identifier (ID) to each client device, obtain information relating to the client device, such as a location associated with the client device and/or subscription information indicating the message types that the client device is to receive, and store the obtained information in client DB 335. Exemplary information that may be stored in client DB 335 is described below with reference to FIG. 4A.

Mobility message service 340 may publish V2X messages to particular client devices. For example, mobility message service 340 may receive a V2X message over MQTT and determine which client devices are to receive the V2X message. Mobility message service 340 may maintain information relating to the location of each client device in client position DB 345. Exemplary information that is stored in client position DB 345 is described below with reference to FIG. 4B. Mobility message service 340 may determine a location and message type for the V2X message and may identify client devices, located within a particular distance of the determined location associated with the V2X message, that are subscribed to receive V2X message of the determined message type, based on information stored in client DB 335 and/or client position DB 345. The identified client devices may include OBD devices 112, mobile communication devices 120, and/or RSUs 195.

Mobility message service 340 may then select a subset of the identified client devices to which to send the V2X message. The selection may be made based on geographic or situational relevance using map information (for a geographic area) obtained from map system 170 via map system interface 355. Mobility message service 340 may select all the RSUs 195 from the identified client devices, and may select OBD devices 112 and mobile communication devices 120 from the identified client devices for which the V2X message is determined to have geographic or situational relevance.

As an example, mobility message service 340 may eliminate an OBD device 112 or mobile communication device 120 from the identified list of client devices if the OBD device 112 or mobile communication device 120 is located on a second street that is different than a first street associated with the received V2X message, if the second street is parallel to the first street or located more than one intersection away from the first street. As another example, mobility message service 340 may eliminate an OBD device 112 or mobile communication device 120 from the identified list of client devices if the OBD device 112 or mobile communication device 120 is moving in an opposite direction on a divided road compared to a direction associated with the received V2X message. As yet another example, mobility message service 340 may eliminate an OBD device 112 or mobile communication device 120 from the identified list of client devices if the OBD device 112 or mobile communication device 120 is associated with a parked vehicle, is associated with a same vehicle as the received V2X message, and/or is located inside a building.

In some implementations, mobility message service 340 may determine the geographic or situational relevance for OBD device 112 or mobile communication device 120 using a machine learning model trained to identify situations in which a particular location may not be relevant to OBD device 112 or mobile communication device 120. The trained machine learning model may take as input a map of an area; information relating to a location, direction, speed, and/or acceleration associated with a V2X message; and information relating to a location, direction, speed, and/or acceleration associated with the OBD device 112 or mobile communication device 120. The machine learning model may include a trained deep learning neural network, or another type of machine learning classifier, such as, for example, a Support Vector Machine (SVM) classifier, a K-nearest neighbors (KNN) classifier, a naïve Bayesian classifier, a random forest classifier, a logistic regression classifier, a linear discriminant analysis classifier, a quadratic linear discriminant analysis classifier, a maximum entropy classifier, a kernel density estimation classifier, a principal component analysis (PCA) classifier, etc.

Traffic controller proxy 350 may communicate with traffic lights 124 and/or traffic light controller 180. For example, traffic controller proxy 350 may receive SPaT messages from traffic lights 124 and/or traffic light controller 180 and provide the SPaT messages to message broker 320. Furthermore, traffic controller proxy 350 may provide information to traffic light controller 180. For example, traffic controller proxy 350 may assist traffic light controller 180 with traffic light timing, for example, by extending the duration of a red or green traffic light of a particular traffic light 124 to reduce the likelihood of a collision at a particular intersection when a vehicle is about to go through a red light, when a large vehicle is located in a danger zone associated with an intersection, when an emergency vehicle is approaching an intersection, and/or based on another situation.

RSU proxy 360 may be configured to interface RSUs 195 with V2X object exchange system 300. RSU proxy 360 may register each RSU 195 as a client with client registration service 330 and may receive a client ID for each RSU 195 from client registration service 330. Furthermore, RSU proxy 360 may identify a location for RSU 195 and determine a radius of interest for RSU 195. The location information and radius of interest may be used to determine the geographic area associated with RSU 195. After registering RSU 195, RSU proxy 360 may then open a User Datagram Protocol (UDP) listener to listen for messages from RSU 195. When RSU proxy 360 receives a message from RSU 195, RSU proxy 360 may publish the received message to message broker 320. An example format used by RSU proxy 360 to publish the received incoming message may include: V2X/1/IN/RSU/NA/[vendorID]/[RSU ID]/UPER/[message type].

OBD proxy 370 may support OBD devices 112 configured for PC5 but without the capability to use a Uu interface. OBD proxy 370 may register each PC5 OBD device 112 as a client with client registration service 330 and may receive a client ID for each PC5 OBD device 112 from client registration service 330. After registering the PC5 OBD device 112, OBD proxy 370 may then open a UDP listener to listen for messages from the PC5 OBD device 112. When OBD proxy 370 receives a message from the PC5 OBD device 112, OBD proxy 370 may publish the received message to message broker 320. An example format used by OBD proxy 370 to publish the received incoming message may include: V2X/1/IN/OBD/NA/[vendorID]/[OBD ID]/UPER/[message type]. OBD proxy 370 may further subscribe to message broker 320 to receive OBD-specific topics. An example format used by OBD proxy 370 to subscribe to OBD messages may include: V2X/1/OUT/OBD/NA/[vendorID]/[OBD ID]/UPER/[message type].

UE device interface 380 may be configured to communicate with mobile communication devices 120 and/or OBD devices 112 configured to use a Uu interface. UE device interface 380 may register each OBD device 112 and/or mobile communication device 120 as a client with client registration service 330 and may receive a client ID for each OBD device 112 and/or mobile communication device 120 from client registration service 330. After registering OBD device 112 and/or mobile communication device 120, UE device interface 380 may then open a UDP listener to listen for messages from OBD device 112 and/or mobile communication device 120. When UE device interface 380 receives a message from OBD device 112 and/or mobile communication device 120, UE device interface 380 may publish the received message to message broker 320. Furthermore, UE device interface 380 may further subscribe to message broker 320 to receive particular topics relating to OBD device 112 and/or mobile communication device 120.

Although FIG. 3 shows exemplary components of MEC device 145, in other implementations, MEC device 145 may include fewer components, different components, differently arranged components, or additional components than depicted in FIG. 3. Additionally, or alternatively, one or more components of MEC device 145 may perform functions described as being performed by one or more other components of MEC device 145.

Figure 4A:
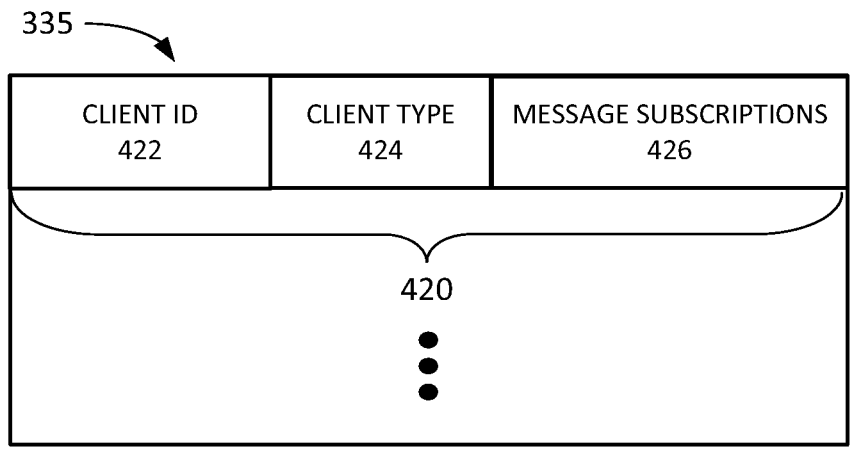
FIG. 4A illustrates exemplary components of the client database of FIG. 3 according to an implementation described herein.

FIG. 4A illustrates exemplary components of client DB 335 according to an implementation described herein. As shown in FIG. 4A, client DB 335 may include one or more client records 420. Each client record 420 may store information relating a particular client device registered with V2X object exchange system 300. Client record 420 may include a client ID field 422, a client type field 424, and a message subscriptions field 426.

Client ID field 422 may store a unique client ID assigned to the particular client device by V2X object exchange system 300. Additionally, client ID field 422 may store an address associated with the particular client device that may be used to send messages to the particular client device, such as, for example, an IP address, an International Mobile Subscriber Identity (IMSI), an International Mobile Station Equipment Identity (IMEI), etc.

Client type field 424 may store information identifying a client type associated with the particular client device. For example, client type field 424 may identify the client device as an RSU 195 of a particular type, an OBD device 112 of a particular type, a mobile communication device 120 of a particular type, and/or another type of client device. Message subscriptions field 426 may identify message types to which the particular client device is subscribed, such as, for example, as a BSM message type, a PSM message type, an EVA message type, a SPaT message type, an RSA message type, a particular type of BSM message, a particular type of PSM message, etc.

Although FIG. 4A shows exemplary components of client DB 335, in other implementations, client DB 335 may include fewer components, different components, additional components, or differently arranged components than depicted in FIG. 4A.

Figure 4B:
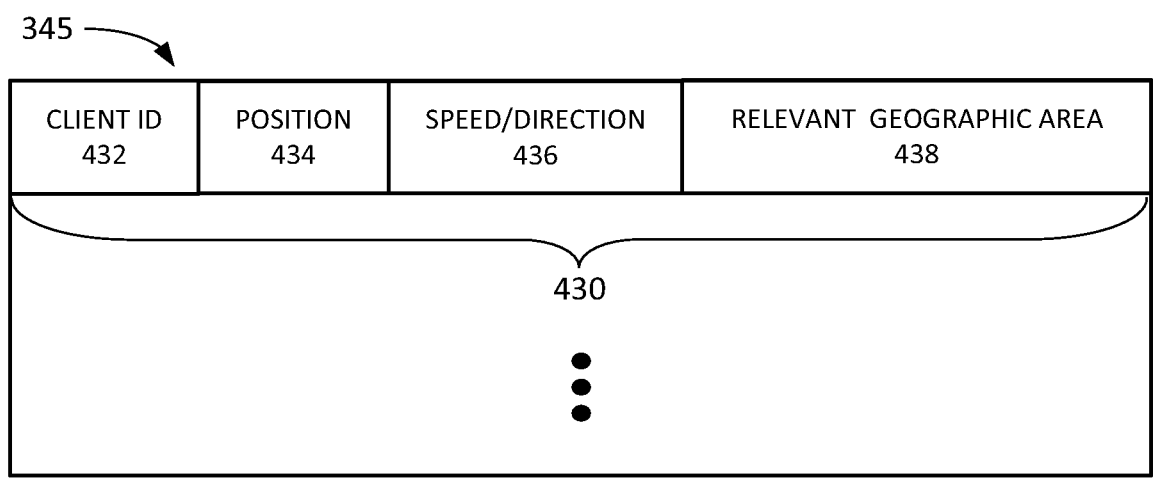
FIG. 4B illustrates exemplary components of the client position database of FIG. 3 according to an implementation described herein.

FIG. 4B illustrates exemplary components of client position DB 345 according to an implementation described herein. As shown in FIG. 4B, client position DB 345 may store one or more client position records 430. Each client position record 430 may store information on a particular registered client device. Client position record 430 may include a client ID field 432, a position field 434, a speed/direction field 436, and a relevant geographic area 438.

Client ID field 432 may store a client ID associated with a particular registered client device from client D 335. Position field 434 may store information identifying a current or last known position for the client device, such as, for example, GPS information, RTK information, a particular intersection, a street, a city block, etc. Speed/direction field 436 may indicate a current or last known speed and direction of the client device.

Relevant geographic area 438 may store information identifying the relevant geographic area for the client device based on the position identified in position field 434 and based on map information obtained by map system interface 355. As an example, if the client device is located on a particular street, the relevant geographic area may be determined to be the particular street and the nearest intersecting streets in each direction (e.g., in a traveling direction and the direction opposite to the traveling direction). As another example, if the client device is located in a parking lot, the relevant geographic area may be determined to be the parking lot. As yet another example, if the client device is located on a divided street, the relevant geographic area may exclude the other side of the street.

Although FIG. 4B shows exemplary components of client position DB 345, in other implementations, client position DB 345 may include fewer components, different components, additional components, or differently arranged components than depicted in FIG. 4B.

Figure 5:
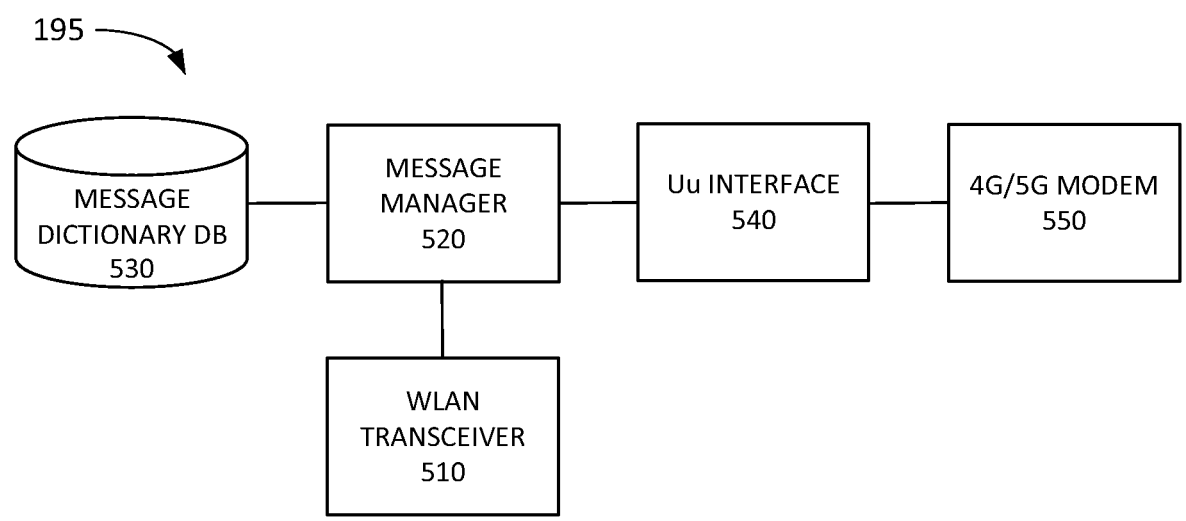
FIG. 5 illustrates exemplary components of the roadside unit of FIG. 1 according to an implementation described herein.

FIG. 5 illustrates exemplary components of RSU 195 according to an implementation described herein. The components of RSU 195 may be implemented, for example, via processor 220 executing instructions from memory 230. Alternatively, some or all of the components of RSU 195 may be implemented via hard-wired circuitry. As shown in FIG. 5, RSU 195 may include a WLAN transceiver 510, a message manager 520, a message dictionary DB 530, a Uu interface 540, and a 4G/5G modem 550.

WLAN transceiver 510 may be configured to receive and send V2X messages using a WLAN communication process, such as WiFi technology based on the IEEE 802.11 family of standards. Message manager 520 may manage V2X messages received by RSU 195. For example, if RSU 195 receives a message from OBD device 112, camera 122, and/or traffic light 124, message manager 520 may broadcast the message in its coverage area using WLAN transceiver 510. Furthermore, message manager 520 may forward the message to V2X object exchange system 300 via base station 135 using Uu interface 540 and 4G/5G modem 550. Additionally, message manager 520 may receive a message from V2X object exchange system 300 via base station 135 using Uu interface 540 and 4G/5G modem 550 and may broadcast the message in its coverage area using WLAN transceiver 510.

Message dictionary DB 530 may include a dictionary of messages between a WLAN format and a Uu format. Message manager 520 may convert messages between a first format, associated with WLAN signals, and a second format, associated with cellular wireless signals, using message dictionary DB 530. As an example, if RSU 195 corresponds to a DSRC RSU, message manager 520 may use message dictionary DB 530 to convert DSRC messages to V2X messages and to convert V2X messages to DSRC messages. As another example, if RSU 195 corresponds to a CAM RSU, message manager 520 may use message dictionary DB 530 to convert CAM messages to V2X messages and to convert V2X messages to CAM messages. As yet another example, if RSU 195 corresponds to a DSSS RSU, message manager 520 may use message dictionary DB 530 to convert DSSS messages to V2X messages and to convert V2X messages to DSSS messages.

Uu interface 540 may implement a 4G/5G Uu interface. 4G/5G modem 550 may be configured to receive cellular wireless messages from base station 135 and to send cellular wireless messages to base station 135.

Although FIG. 5 shows exemplary components of RSU 195, in other implementations, RSU 195 may include fewer components, different components, differently arranged components, or additional components than depicted in FIG. 5. Additionally, or alternatively, one or more components of RSU 195 may perform functions described as being performed by one or more other components of RSU 195.

Figure 6:
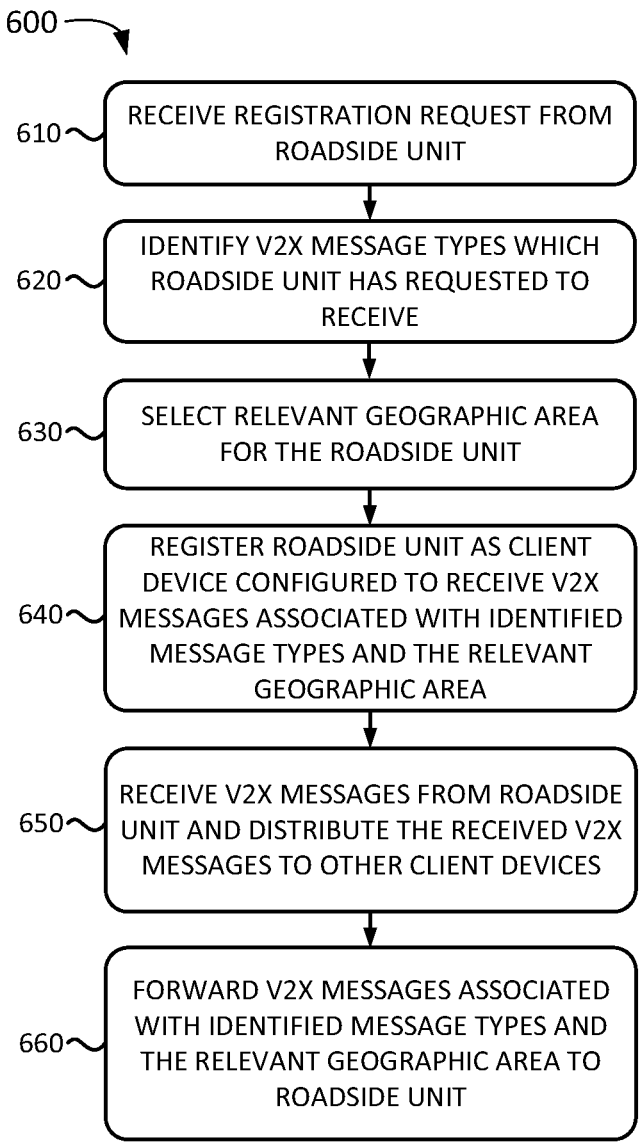
FIG. 6 illustrates a flowchart of a process for processing messages associated with a roadside unit according to an implementation described herein.

FIG. 6 illustrates a flowchart of a process for processing messages associated with a roadside unit according to an implementation described herein. In some implementations, process 600 of FIG. 6 may be performed by MEC device 145. In other implementations, some or all of process 600 may be performed by another device or a group of devices separate from MEC device 145.

As shown in FIG. 6, process 600 may include receiving a registration request from an RSU (block 610). For example, RSU proxy 360 may request to register RSU 195 with client registration service 330. V2X message types which the RSU has requested to receive may be identified (block 620), a relevant geographic area for the RSU may be selected (block 630), and the RSU may be registered as a client device configured to receive V2X messages associated with the identified message types and the relevant geographic area (block 640). For example, RSU proxy 360 may register RSU 195 as a client with client registration service 330 and may receive a client ID for RSU 195 from client registration service 330. RSU proxy 360 may identify a location for RSU 195 and determine a radius of interest for RSU 195. The location information and radius of interest may be used to determine the relevant geographic area associated with RSU 195. Furthermore, RSU proxy 360 may obtain information identifying the types of messages that are to be sent to RSU 195 and may subscribe RSU 195 to receive V2X messages associated with the identified message types.

V2X messages from the RSU may be received and distributed to other client devices (block 650). For example, RSU proxy 360 may receive V2X messages from RSU 195 via a Uu interface and may publish the received message to message broker 320 for distribution to other client devices. Furthermore, V2X messages associated with the identified message types and the relevant geographic area may be forward to the RSU (block 660). For example, RSU proxy 360 may subscribe to message broker 320 to receive messages, in the determined relevant geographic area, of the types to which RSU 195 has subscribed. Mobility message service 340 may publish V2X messages, in the determined relevant geographic area, and of the message types to which RSU 195 has subscribed, to message broker 320. Message broker 320 may push the published V2X messages to RSU proxy 360. RSU proxy 360 may then send the messages to RSU 195 via base station 135 using the Uu interface.

In some implementations, RSU proxy 360 may translate a received message from RSU 195 from a native format into a V2X message and/or may translate a V2X message into a native format associated with RSU 195 before sending the message to RSU 195. As an example, if RSU 195 corresponds to a DSRC RSU, RSU proxy 360 may receive a message from RSU 195 in a DSRC format and translate the message to a V2X message, and/or may translate a V2X message into a DSRC format before sending the V2X message to RSU 195. As another example, if RSU 195 corresponds to a PC5 RSU, RSU proxy 360 may receive a message from RSU 195 in a PC5 format and translate the message to a V2X message, and/or may translate a V2X message into a PC5 format before sending the V2X message to RSU 195. As yet another example, if RSU 195 corresponds to a CAM RSU, RSU proxy 360 may receive a message from RSU 195 in a CAM format and translate the message to a V2X message, and/or may translate a V2X message into a CAM format before sending the V2X message to RSU 195. Thus, V2X object exchange system 300 may translate V2X messages from a first format (e.g., a first type of RSU 195) associated with the first technology into a second format associated with a second technology (e.g., a second type of RSU 195).

Figure 7:
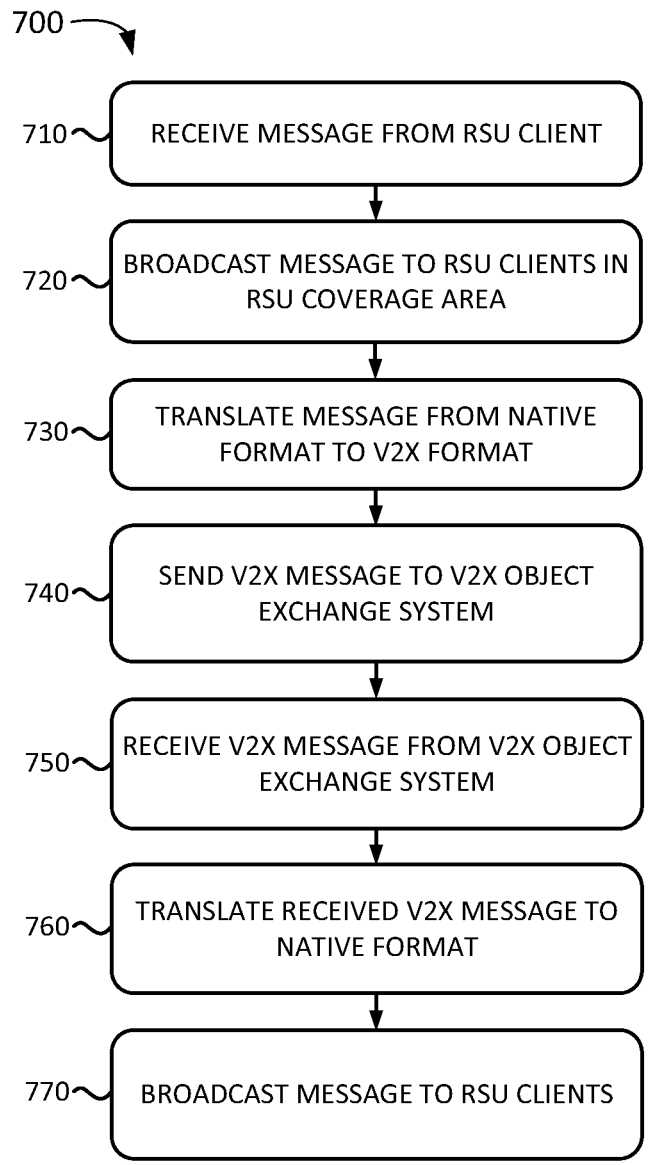
FIG. 7 illustrates a flowchart of a process for processing messages by a roadside unit according to an implementation described herein.

FIG. 7 illustrates a flowchart of a process 700 for processing messages by a roadside unit according to an implementation described herein. In some implementations, process 700 of FIG. 7 may be performed by RSU 195. In other implementations, some or all of process 700 may be performed by another device or a group of devices separate from RSU 195.

As shown in FIG. 7, process 700 may include receiving a message from an RSU client (block 710) and broadcasting the received message to RSU clients in the coverage area of the RSU (block 720). For example, RSU 195 may receive V2X messages from OBD devices 112, cameras 122, and/or traffic lights 124 and may broadcast the received messages.

Process 700 may further include translating the received message from a native format to a V2X format (block 730) and sending the V2X message to the V2X object exchange system using a Uu interface (block 740). As an example, RSU 195 that corresponds to a DSRC RSU may translate a received DSRC message into a V2X message and send the V2X message to V2X object exchange system 300 via base station 135 using the Us interface. As another example, RSU 195 that corresponds to a PC5 RSU may translate a received PC5 message into a V2X message and send the V2X message to V2X object exchange system 300 via base station 135 using the Us interface. As yet another example, RSU 195 that corresponds to a CAM RSU may translate a received CAM message into a V2X message and send the V2X message to V2X object exchange system 300 via base station 135 using the Uu interface.

Process 700 may further include receiving a V2X message from the V2X object exchange system (block 750), translating the received V2X message to a native format (block 760), and broadcasting the message to RSU clients in the coverage area of the RSU (block 770). For example, RSU 195 that corresponds to a DSRC RSU may receive a V2X message from V2X object exchange system 300 via base station 135 using the Uu interface, translate the received V2X message into a DSRC message, and broadcast the DSRC message to RSU clients in the coverage area of RSU 195. As another example, RSU 195 that corresponds to a PC5 RSU may receive a V2X message from V2X object exchange system 300 via base station 135 using the Uu interface, translate the received V2X message into a PC5 message, and broadcast the PC5 message RSU clients in the coverage area of RSU 195. As yet another example, RSU 195 that corresponds to a CAM RSU may receive a V2X message from V2X object exchange system 300 via base station 135 using the Uu interface, translate the received V2X message into a CAM message, and broadcast the CAM message RSU clients in the coverage area of RSU 195.

Figure 8:
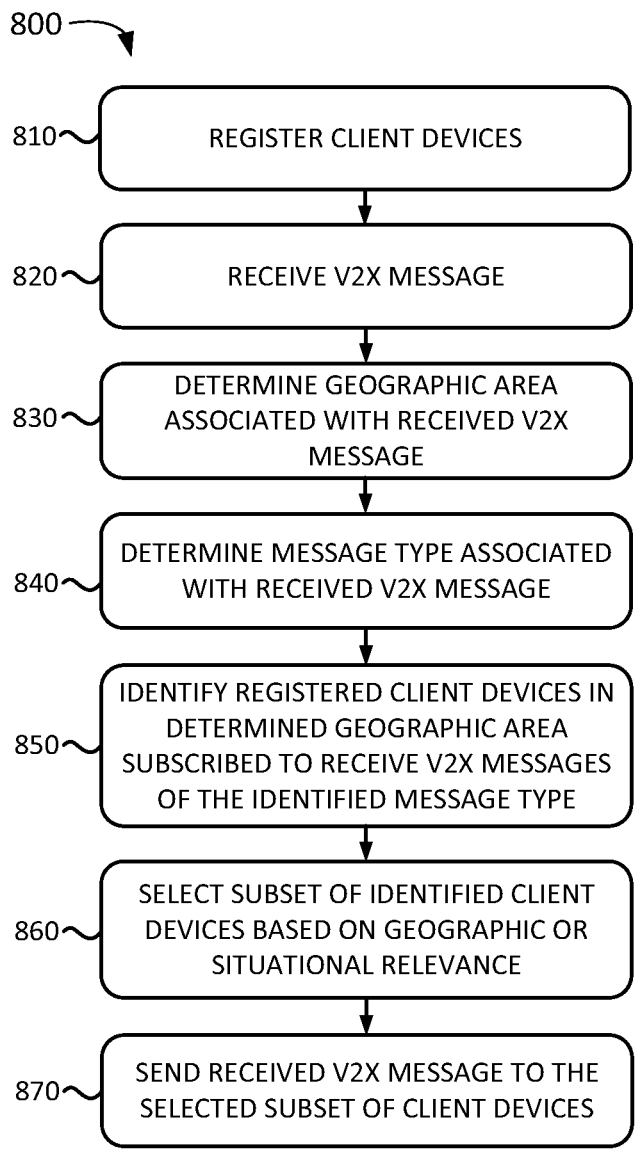
FIG. 8 illustrates a flowchart of a process for processing Vehicle-To-Everything (V2X) messages according to an implementation described herein.

FIG. 8 illustrates a flowchart of a process for processing V2X messages according to an implementation described herein. In some implementations, process 800 of FIG. 8 may be performed by MEC device 145. In other implementations, some or all of process 800 may be performed by another device or a group of devices separate from MEC device 145.

As shown in FIG. 8, process 800 may include registering client devices (block 810). For example, V2X object exchange system 300 may receive registration requests from OBD devices 112, mobile communication devices 120, and/or RSUs 195, and register the OBD devices 112, mobile communication devices 120, and/or RSUs 195 in client DB 335.

Process 800 may further include receiving a V2X message (block 820), identifying a geographic area associated with the received V2X message (block 830), and identifying a message type associated with the received V2X message (block 840). As an example, V2X object exchange system 300 may receive object recognition information from camera 122 and generate a BSM or a PSM based on the received object recognition information. As another example, V2X object exchange system 300 may receive an alert message from alert system 175, such as an alert message relating to traffic congestion, vehicle accidents, hazardous road conditions, road construction, road closures, weather events, law enforcement emergencies, and/or other types of alert information, and, in response, generate an RSA message with the alert information. As yet another example, V2X object exchange system 300 may receive a BSM or PSM from RSU 195. As yet another example, V2X object exchange system 300 may receive a BSM or PSM from OBD device 112 or mobile communication device 120.

The V2X message may include a message ID; a message type such as, for example, a BSM message type, a PSM message type, an EVA message type, a SPaT message type, an RSA message type, a type of BSM message, a type of PSM message, and/or another message type; information identifying a source of the V2X message, such as information identifying a particular vehicle 110, OBD device 112, mobile communication device 120, camera 122, traffic light 124, alert system 175, RSU 195, and/or another type of source device; information identifying a location associated with the particular V2X message, such as GPS information, RTK information, a particular intersection, a street, a city block, etc.; and a message payload that includes, for example, one or more flags indicating a status associated with the source of the particular V2X message, a speed and/or direction associated with the source of the particular V2X message, information indicating a particular type of road hazard, and/or other types of information that may be useful to a recipient of the V2X message.

Registered client devices, in the determined geographic area, which are subscribed to receive V2X messages of the identified message type may be identified (block 850) and a subset of the identified client devices may be selected based on geographic or situational relevance (block 860). For example, V2X object exchange system 300 may identify client devices, located within a particular distance of the determined location associated with the V2X message, and which are subscribed to receive V2X messages of the determined message type, based on information stored in client position DB 345. The identified client devices may include OBD devices 112, mobile communication devices 120, and/or RSUs 195. V2X object exchange system 300 may then select a subset of the identified client devices to which the V2X message is to be sent based on geographic or situational relevance using map information, for a geographic area, obtained from map system 170 via map system interface 355. Mobility message service 340 may select all the RSUs 195 from the identified client devices, and may select OBD devices 112 and mobile communication devices 120 from the identified client devices for which the V2X message is determined to have geographic or situational relevance.

The received V2X message may be sent to the selected subset of client devices (block 870). For example, mobility message service 340 may publish client-specific V2X messages to message broker 320 based on the received V2X message and message broker 320 may distribute the client-specific V2X messages to RSU proxy 360, OBD proxy 370, and/or UE device interface 380. RSU proxy 360, OBD proxy 370, and/or UE device interface 380 may then transmit the V2X message to specific client devices via base station 135 using the Uu interface.

Figure 9:
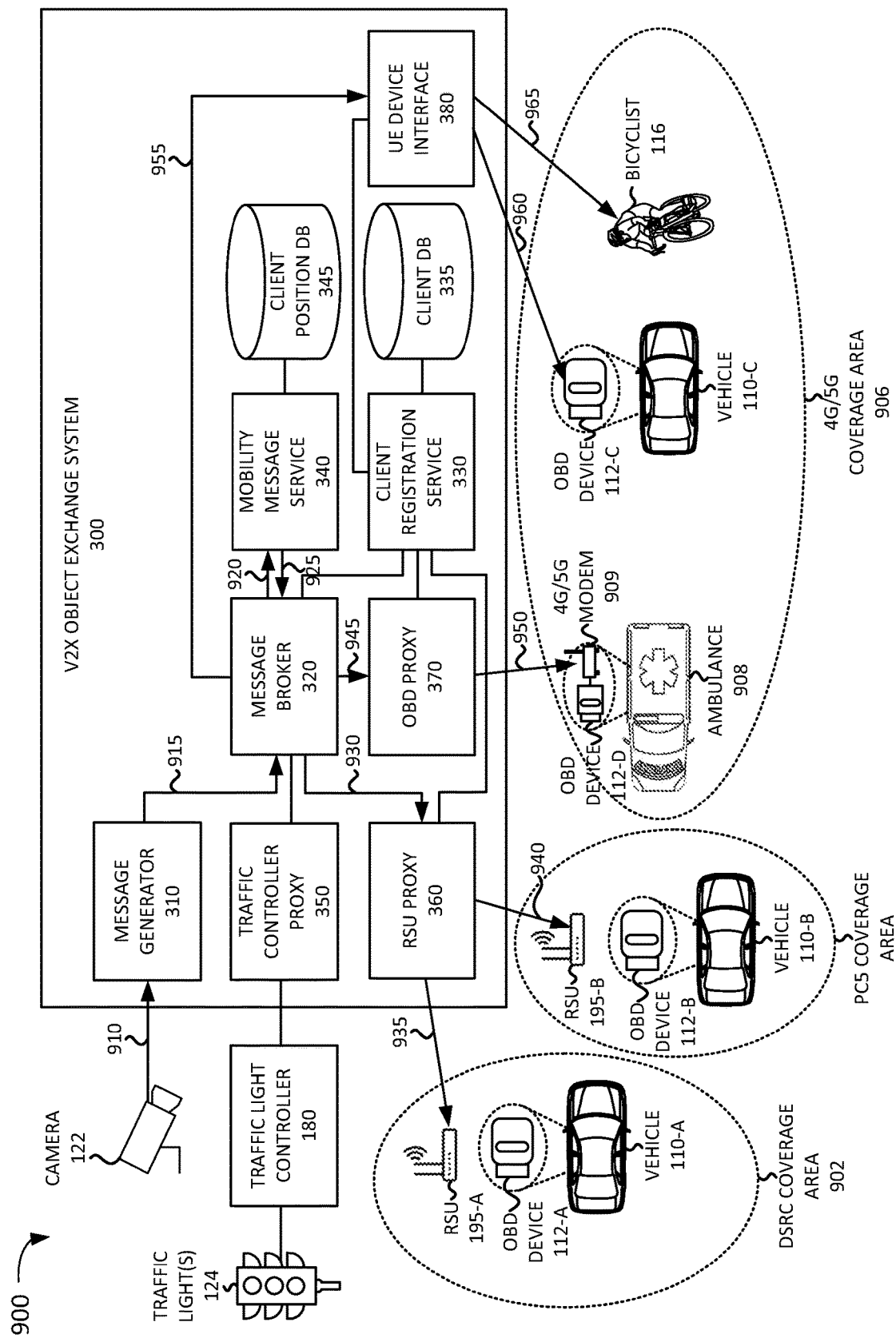
FIG. 9 illustrates an exemplary signal flow scenario according to an implementation described herein.

FIG. 9 illustrates an exemplary signal flow scenario 900 according to an implementation described herein. As shown in FIG. 9, signal flow scenario 900 includes a DSRC coverage area 902 serviced by DSRC RSU 195-A, a PC5 coverage area 904 serviced by PC5 RSU-195-B, and 4G/5G coverage area 906 serviced by base station 135 (not shown in FIG. 9). In signal flow scenario 900, camera 122 generates object detection information and sends the object detection information to message generator 310 of V2X object exchange system 300 (signal 910). Message generator 310 may generate BSMs and PSMs based on the received object detection information. The BSMs and PSMs may include information identifying the location and/or direction of movement of vehicles 110, pedestrians 114, bicyclists 116, and/or electric scooters 118 in the field of view of camera 122. Message generator 310 may publish the generated BSMs and PSMs to message broker 320 (signal 915). Message broker 320 may provide the generated BSMs and PSMs to mobility message service 340 (signal 920).

Mobility message service 340 may determine which client devices should receive which BSMs and/or PSMs based on the distance of each client device to the location associated with each BSM or PSM, based on which client devices have subscribed to receive BSMs and/or PSMs, and/or based on whether each BSM or PSM is geographically or situationally relevant to each client device. Mobility message service 340 may determine that the BSMs and PSMs should be sent to DSRC RSU 195-A, PC5 RSU 195-B, OBD device 112-D of ambulance 908, OBD device 112-C of vehicle 110-C, and mobile communication device 120 of bicyclist 116. Mobility message service 340 may then publish the client-specific messages to message broker 320 (signal 925).

Message broker 320 may provide the BSMs and PSMs to RSU proxy 360 (signal 930). RSU proxy 360 may provide the BSMs and PSMs to DSRC RSU 195-A via a Uu interface (signal 935) and DSRC RSU 195-A may broadcast the BSMs and PSMs in DSRC coverage area 902, resulting in OBD device 112-A receiving the BSMs and PSMs. Furthermore, RSU proxy 360 may provide the BSMs and PSMs to PC5 RSU 195-B via a Uu interface (signal 940) and PC5 RSU 195-B may broadcast the BSMs and PSMs in PC5 coverage area 904, resulting in OBD device 112-B receiving the BSMs and PSMs.

Message broker 320 may further provide the BSMs and PSMs to OBD proxy 370 (signal 945). OBD proxy 370 may provide the BSMs and PSMs to 4G/5G modem 909 of OBD device 112-D via a Uu interface (signal 950). Message broker 320 may further provide the BSMs and PSMs to UE device interface 380 (signal 955). UE device interface 380 may provide the BSMs and PSMs to OBD device 112-C via a Uu interface (signal 960) and to mobile communication device 120 (not shown in FIG. 9) of bicyclist 116 (signal 965).

Figure 10:
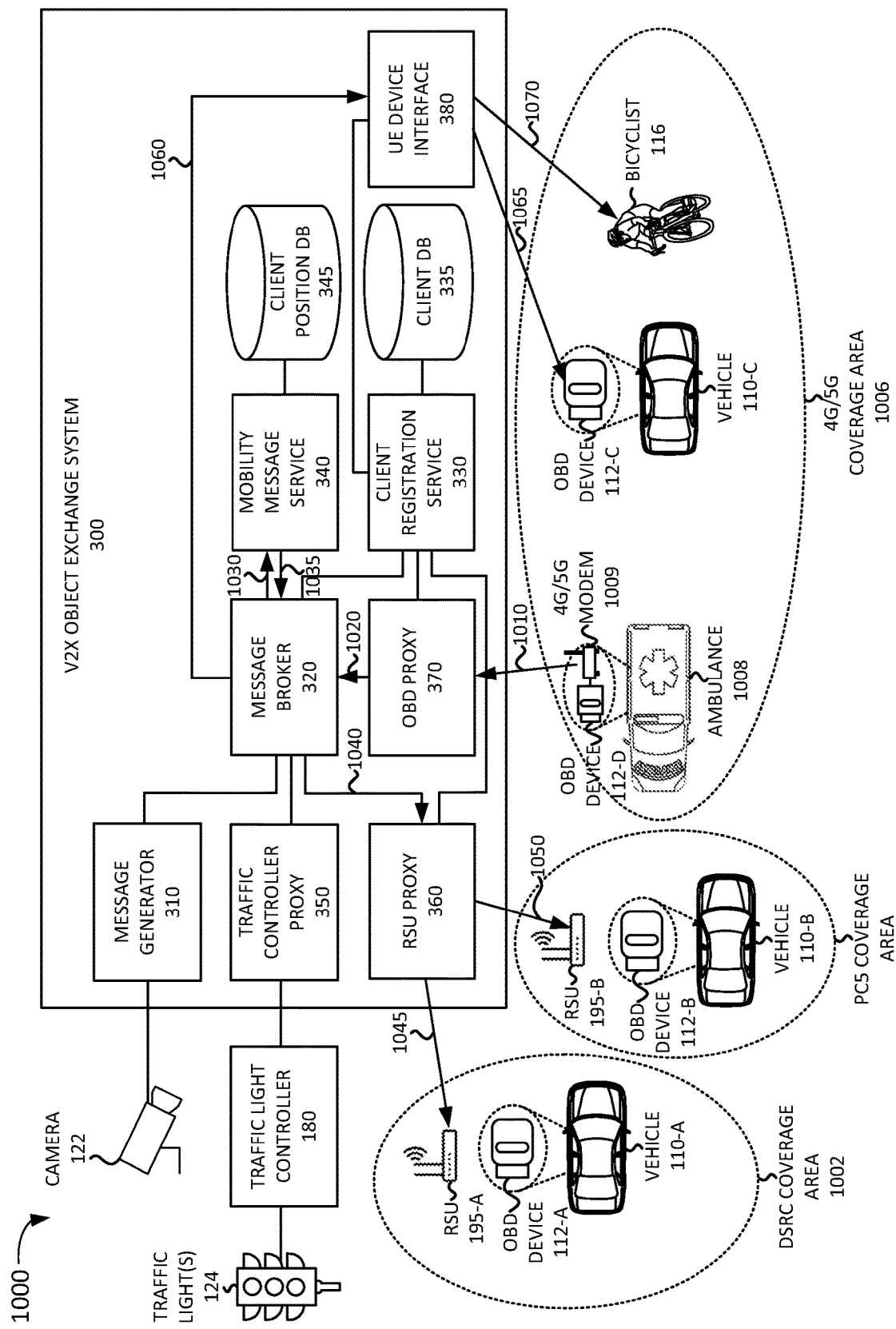
FIG. 10 illustrates another exemplary signal flow scenario according to an implementation described herein.

FIG. 10 illustrates another exemplary signal flow scenario 1000 according to an implementation described herein. As shown in FIG. 10, signal flow scenario 1000 includes a DSRC coverage area 1002 serviced by DSRC RSU 195-A, a PC5 coverage area 1004 serviced by PC5 RSU-195-B, and 4G/5G coverage area 1006 serviced by base station 135 (not shown in FIG. 10). In signal flow scenario 1000, ambulance 1010 sends an EVA message to OBD proxy 370 (signal 1010). OBD proxy 370 may publish the received EVA message to message broker 320 (signal 1020). Message broker 320 may provide the received EVA to mobility message service 340 (signal 1030).

Mobility message service 340 may determine which client devices should receive the EVA based on the distance of each client device to the location associated with the EVA, based on which client devices have subscribed to receive EVAs, and/or based on whether the EVA is geographically or situationally relevant to each client device. Mobility message service 340 may determine that the EVA should be sent to DSRC RSU 195-A, PC5 RSU 195-B, OBD device 112-C of vehicle 110-C, and mobile communication device 120 of bicyclist 116. Mobility message service 340 may then publish the client-specific messages to message broker 320 (signal 1035).

Message broker 320 may provide the EVA to RSU proxy 360 (signal 1040). RSU proxy 360 may provide the EVA to DSRC RSU 195-A via a Uu interface (signal 1045) and DSRC RSU 195-A may broadcast the EVA in DSRC coverage area 1002, resulting in OBD device 112-A receiving the EVA. Furthermore, RSU proxy 360 may provide the EVA to PC5 RSU 195-B via a Uu interface (signal 1050) and PC5 RSU 195-B may broadcast the EVA in PC5 coverage area 1004, resulting in OBD device 112-B receiving the EVA. Message broker 320 may further provide the EVA to UE device interface 380 (signal 1060). UE device interface 380 may provide the EVA to OBD device 112-C via a Uu interface (signal 1065) and to mobile communication device 120 (not shown in FIG. 10) of bicyclist 116 (signal 1070).

Figure 11:
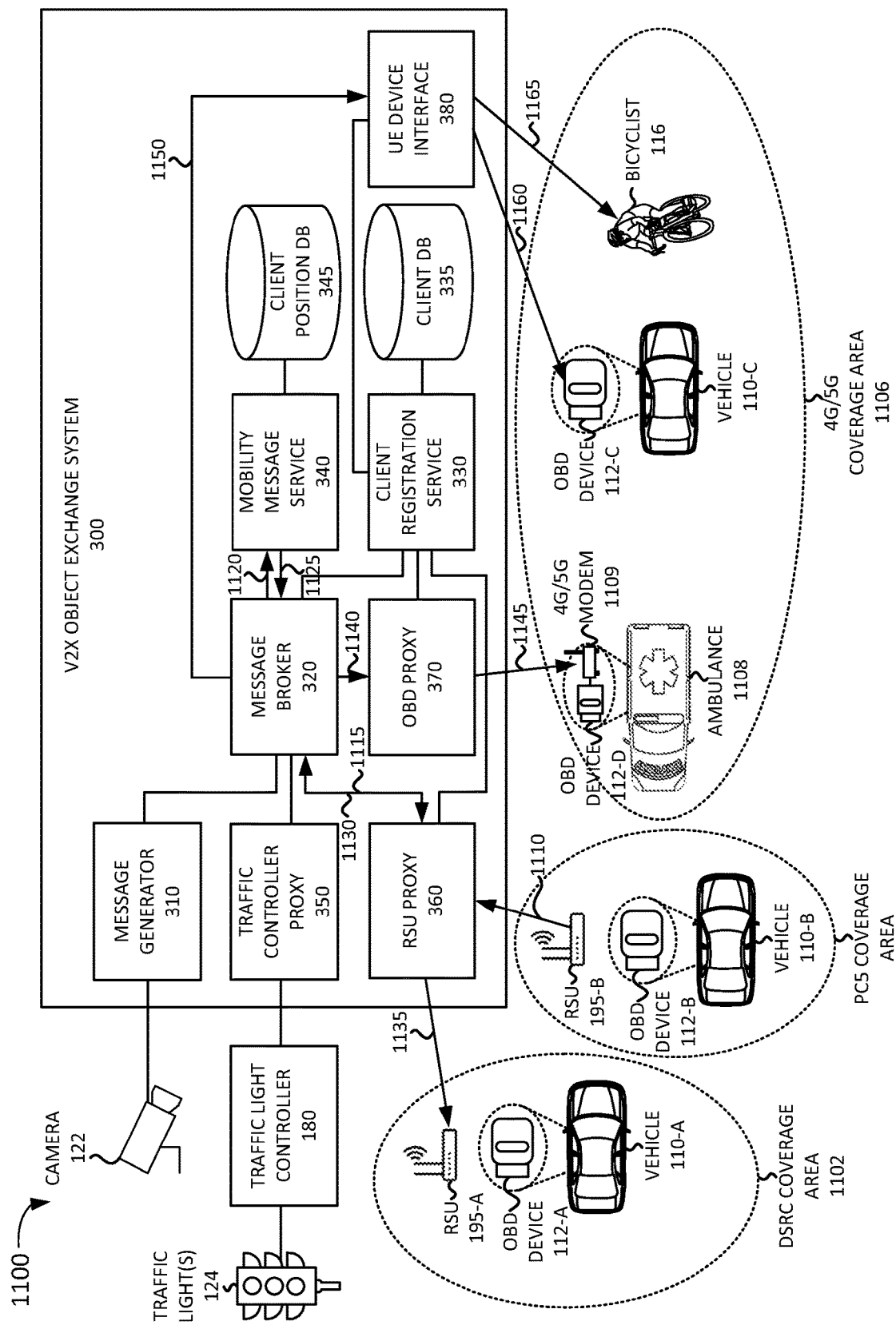
FIG. 11 illustrates yet another exemplary signal flow scenario according to an implementation described herein.

FIG. 11 illustrates yet another exemplary signal flow scenario 1100 according to an implementation described herein. As shown in FIG. 11, signal flow scenario 1100 includes a DSRC coverage area 1102 serviced by DSRC RSU 195-A, a PC5 coverage area 1104 serviced by PC5 RSU-195-B, and 4G/5G coverage area 1106 serviced by base station 135 (not shown in FIG. 11). In signal flow scenario 1100, the driver of vehicle 110-B steps on the brake and vehicle 110-B experiences a "hard brake" scenario (e.g., an acceleration greater than 0.4 g). An accelerometer in OBD device 112-B may detect the hard acceleration and generate a BSM with a "hard braking" event flag. OBD device 112-B may send the hard braking BSM to PC5 RSU 195-B and PC5 RSU 195-B may send a hard braking BSM to RSU proxy 360 (signal 1110).

RSU proxy 360 may forward the hard braking BSM to message broker 320 (signal 1115) and message broker 320 may publish the hard braking BSM to mobility message service 340 (signal 340). Mobility message service 340 may determine which client devices should receive the hard braking BSM based on the distance of each client device to the location associated with the hard braking BSM, based on which client devices have subscribed to receive the hard braking BSM, and/or based on whether the hard braking BSM is geographically or situationally relevant to each client device. Mobility message service 340 may determine that the hard braking BSM should be sent to DSRC RSU 195-A, OBD device 112-D of ambulance 908, OBD device 112-C of vehicle 110-C, and mobile communication device 120 of bicyclist 116. Mobility message service 340 may then publish the client-specific messages to message broker 320 (signal 1125).

Message broker 320 may provide the hard braking BSM to RSU proxy 360 (signal 1130). RSU proxy 360 may provide the hard braking BSM to DSRC RSU 195-A via a Uu interface (signal 1135) and DSRC RSU 195-A may broadcast the hard braking BSM in DSRC coverage area 1102, resulting in OBD device 112-A receiving the hard braking BSM.

Message broker 320 may further provide the hard braking BSM to OBD proxy 370 (signal 1140). OBD proxy 370 may provide the hard braking BSM to 4G/5G modem 909 of OBD device 112-D via a Uu interface (signal 1145). Message broker 320 may further provide the hard braking BSM to UE device interface 380 (signal 1150). UE device interface 380 may provide the hard braking BSM to OBD device 112-C via a Uu interface (signal 1155) and to mobile communication device 120 (not shown in FIG. 11) of bicyclist 116 (signal 1160).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6, 7, and 8, and a series of signals has been described with respect to FIGS. 9, 10, and 11, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by a computer device, a Vehicle-to-Everything (V2X) message;
   selecting, by the computer device, a set of client devices based on a location of a particular client device, of a plurality of client devices registered with the computer device, being within a particular geographic distance of a location associated with the V2X message and based on geographic or situational relevance between the location associated with the V2X message and the location of the particular client device; and
   sending, by the computer device, the received V2X message to the selected set of client devices.

2. The method of claim 1, wherein selecting the set of client devices based on geographic or situational relevance includes:
   eliminating a client device from the set of client devices based on determining that the client device is located on a second street that is different than a first street associated with the received V2X message, wherein the second street is parallel to the first street or located more than one intersection away from the first street.

3. The method of claim 1, wherein selecting the set of client devices based on geographic or situational relevance includes:
   eliminating a client device from the set of client devices based on determining that the client device is driving in an opposite direction on a divided road compared to a direction associated with the received V2X message.

4. The method of claim 1, wherein selecting the set of client devices based on geographic or situational relevance includes:
   eliminating a client device from the set of client devices based on determining that the client device is associated with a parked vehicle.

5. The method of claim 1, wherein selecting the set of client devices based on geographic or situational relevance includes:
   eliminating a client device from the set of client devices based on determining that the client device is inside a building.

6. The method of claim 1, wherein the V2X message includes at least one of:
   a Basic Safety Message (BSM) message;
   a Personal Safety Message (PSM) message;
   a Signal Phase and Timing (SPaT) message;
   a Roadside Alert (RSA) message; or
   an Emergency Vehicle Alert (EVA) message.

7. The method of claim 1, wherein the V2X message is received from:
   a Road Side Unit (RSU);
   an on-board diagnostics (OBD) device in a vehicle;
   a mobile communication device associated with a pedestrian;
   an alert system associated with a road sensor;
   a traffic signal controller; or
   a street camera.

8. The method of claim 1, wherein the selected set of client devices includes at least one Road Side Unit (RSU), and wherein the at least one RSU is associated with a first communication technology, wherein the V2X message is received from another RSU associated with a second communication technology different from the first communication technology, and wherein the method further includes:
   translating the V2X message from a first format associated with the second technology into a second format associated with the first technology.

9. The method of claim 8, wherein the at least one RSU includes at least one of:
   a Direct Short Radio Communications (DSRC) RSU;
   a PC5 RSU; or
   a Cooperative Awareness Message (CAM) RSU.

10. A device comprising:
    a processor configured to:
      receive a Vehicle-to-Everything (V2X) message;
      select a set of client devices based on a location of a particular client device, of a plurality of client devices registered with the device, being within a particular geographic distance of a location associated with the V2X message and based on geographic or situational relevance between the location associated with the V2X message and the location of the particular client device; and
      send the received V2X message to the selected set of client devices.

11. The device of claim 10, wherein, when selecting the set of client devices based on geographic or situational relevance, the processor is further configured to:
    eliminate a client device from the set of client devices based on determining that the client device is located on a second street that is different than a first street associated with the received V2X message, wherein the second street is parallel to the first street or located more than one intersection away from the first street.

12. The device of claim 10, wherein, when selecting the set of client devices based on geographic or situational relevance, the processor is further configured to:
    eliminate a client device from the set of client devices based on determining that the client device is driving in an opposite direction on a divided road compared to a direction associated with the received V2X message.

13. The device of claim 10, wherein, when selecting the set of client devices based on geographic or situational relevance, the processor is further configured to:
    eliminate a client device from the set of client devices based on determining that the client device is associated with a parked vehicle.

14. The device of claim 10, wherein, when selecting the set of client devices based on geographic or situational relevance, the processor is further configured to:
    eliminate a client device from the set of client devices based on determining that the client device is inside a building.

15. The device of claim 10, wherein the V2X message includes at least one of:
    a Basic Safety Message (BSM) message;
    a Personal Safety Message (PSM) message;
    a Signal Phase and Timing (SPaT) message;
    a Roadside Alert (RSA) message; or
    an Emergency Vehicle Alert (EVA) message.

16. The device of claim 10, wherein the V2X message is received from:
    a Road Side Unit (RSU);
    an on-board diagnostics (OBD) device in a vehicle;
    a mobile communication device associated with a pedestrian;

an alert system associated with a road sensor;

a traffic signal controller; or a street camera.

17. The device of claim 10, wherein the selected set of client devices includes at least one Road Side Unit (RSU), and wherein the at least one RSU is associated with a first communication technology, wherein the V2X message is received from another RSU associated with a second communication technology different from the first communication technology, and wherein the processor is further configured to:

translate the V2X message from a first format associated with the second technology into a second format associated with the first technology.

18. The device of claim 17, wherein the at least one RSU includes at least one of:

a Direct Short Radio Communications (DSRC) RSU;

a PC5 RSU; or a Cooperative Awareness Message (CAM) RSU.

19. A system comprising:

a base station configured to communicate with a plurality of client devices; and a Multi-Access Edge Computing (MEC) device configured to:

receive a Vehicle-to-Everything (V2X) message via the base station;

select a set of client devices based on a location of a particular client device, of the plurality of client devices, being within a particular geographic distance of a location associated with the V2X message and based on geographic or situational relevance between the location associated with the V2X message and the location of the particular client device of; and send the received V2X message to the selected set of client devices via the base station.

20. The system of claim 19, wherein the selected set of client devices includes at least one Road Side Unit (RSU), and wherein the at least one RSU is associated with a first communication technology, wherein the V2X message is received from another RSU associated with a second communication technology different from the first communication technology, and wherein the MEC device is further configured to:

translate the V2X message from a first format associated with the second technology into a second format associated with the first technology.

* * * * *